United States Patent [19]

Miller et al.

[11] Patent Number: 4,815,493
[45] Date of Patent: Mar. 28, 1989

[54] CARTRIDGE BYPASS VALVE

[75] Inventors: Daniel W. Miller, Luckey; Albert F. Cella, Sylvania, both of Ohio

[73] Assignee: Parker-Hannifin Corporation, Cleveland, Ohio

[21] Appl. No.: 98,095

[22] Filed: Sep. 17, 1987

[51] Int. Cl.⁴ .............................................. E16K 17/04
[52] U.S. Cl. ........................... 137/454.5; 137/543.19; 137/543.21; 251/368
[58] Field of Search ............... 137/454.2, 454.4, 454.5, 137/543.19, 543.21; 251/368

[56] References Cited

U.S. PATENT DOCUMENTS

| | | | |
|---|---|---|---|
| 1,602,372 | 10/1925 | Bullen . | |
| 2,223,994 | 12/1940 | Johnson | 137/543.21 X |
| 2,366,004 | 12/1944 | Crittenden | 137/543.19 X |
| 2,697,915 | 12/1954 | Chisholm | 137/543.21 X |
| 3,058,486 | 10/1962 | McDermott et al. | 137/543.19 X |
| 3,084,709 | 4/1963 | Flick et al. | 137/543.19 X |
| 3,830,255 | 8/1974 | Freiheit | 137/543.19 |
| 3,913,615 | 10/1974 | Cooper | 137/543.19 |
| 4,272,368 | 6/1981 | Foord et al. | 210/90 |

*Primary Examiner*—John Rivell
*Attorney, Agent, or Firm*—Ralph E. Jocke

[57] ABSTRACT

A three component bypass valve comprises molded nylon valve body and poppet elements and a retained spring. The valve body includes an annular valve head having a valve seat therein and an integral open sided spring housing in the form of a pair of spaced tracks joined by an end wall. The tracks and end wall serve as a poppet guide and spring retainer, the poppet having notches for mating support surfaces, while the open housing allows pivotal movement of the poppet for ready assembly or replacement of the poppet and spring. The valve head is externally threaded for placement of the valve in a threaded bore of a fluid filter and the like.

21 Claims, 4 Drawing Sheets

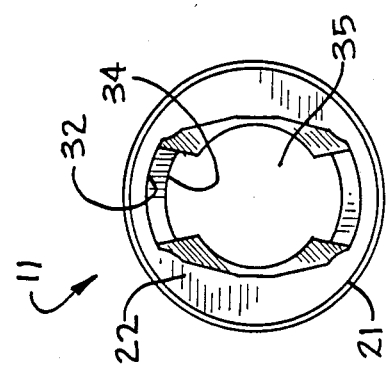
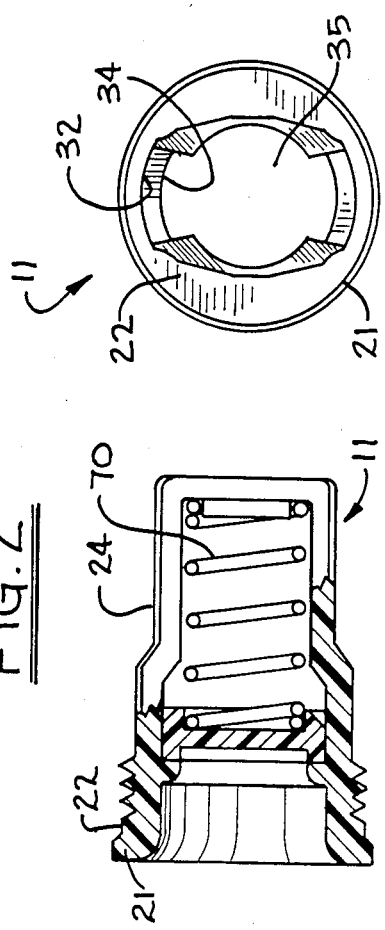
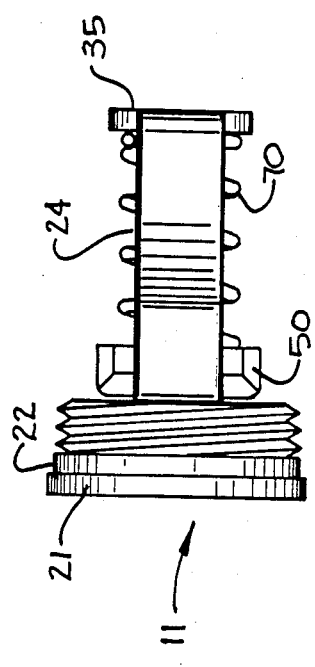
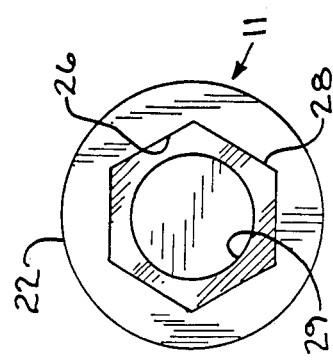

4,815,493

CARTRIDGE BYPASS VALVE

BACKGROUND OF THE INVENTION

This invention relates to check valves and more particularly to a bypass type of valve for fluid filters and the like, which valve is of simplified unitary construction especially suited for assembly and removal from the filter and the like for maintenance purposes or for a change of operating characteristics.

Similar types of valves have been utilized in the past in many different configurations. Once such example is shown in U.S. Pat. No. 3,913,615, designed particularly for fluid filters and the like, and characterized by a simplified assembly of components. In this example, the valve is formed of a minimum of components and is fabricated by the bending of a plurality of struts into a spring housing which then is secured in an annular support by means of a turned-in edge. The necessary spring and poppet are assembled into the housing prior to being secured in the support and the poppet is guided in its movement at its periphery by the four struts forming the housing. While this is an economical design, the entire assembly is not readily removable or replaceable in a filter housing or the like, but rather is designed to be secured in place by staking or a similar operation, and further the spring and valve poppet are permanently retained in the assembly and cannot be interchanged.

Another valve construction which is designed for convenient repair or replacement purposes is shown in U.S. Pat. No. 1,602,372. This valve is designed for use in pumps and the like and consists of a valve base which may be connected in any convenient manner to a pump structure and which includes a rearwardly extending spider having three equally spaced arms which terminate in an end hub and form the spring and poppet housing. In this arrangement replacement of the spring and/or poppet is effected by unthreading the spider from its base whereupon a central bolt can be disengaged from a nut to release the components of the subassembly. While this valve construction provides interchangeability of components, it involves a relatively high number of elements which require manual assembly prior to placement in a filter housing or the like.

A still further variation of prior art valve is shown in U.S. Pat. No. 4,272,368. This valve is also of simplified construction and particularly suited for placement in filter housings and the like, and comprises a structure having a central support member with poppet and spring slidably received thereon and secured by a lock member. This type of valve is reversible in assembly to provide variations in the opening characteristics thereof, and is limited to some extent by the restriction to flow effected by the central support structure. Further, this valve configuration requires a relatively high number of components and is not particularly suited to ready replacement or interchange of components.

SUMMARY OF THE INVENTION

The cartridge type valve of the instant invention is advantageous in several respects, including in particular that it is comprised of a minimum of components comprising simply the valve body including an integral valve head and spring housing and only further including the poppet and bias spring. The valve body is designed so that the poppet and spring can be assembled simply by inserting the valve poppet into the spring housing and pivoting same to a position cooperative with the valve seat. The bias spring may then be inserted between the poppet and end wall of the spring housing to urge the poppet into engagement with the valve seat. The poppet includes a pair of spaced notches which closely receive the tracks forming the spring housing to guide the poppet in movement toward and away from the valve seat and an angled portion of the tracks provides a poppet stop function for limiting outward movement of the poppet away from the valve seat. The valve body is formed preferably as an injection molded part with the valve seat integral therein and not requiring additional machining. The valve body preferably includes external threads thereon to facilitate assembly and disassembly from a valve housing and the like. Still further, the valve body and valve poppet may be commonly molded from the same material, preferably glass-filled nylon, to provide a good seal between the valve seat and poppet and compatibility for a wide range of fluids.

The valve of the instant invention is advantageous in that it requires no fasteners or special assembly operations to hold the valve components together. Being a cartridge assembly, it can be readily installed into a threaded bore in a valve housing, and since the valve body is formed of plastic material, no additional components are required to achieve sealing with the valve housing. Still further, because of the minimum number of components in the valve design and the simplified form of assembly thereof, extremely low labor and material costs are achieved in this design and production is possible on a high volume basis.

BRIEF DESCRIPTION OF THE DRAWINGS

FIG. 2 is a plan view of the bypass valve of the invention;

FIGS. 3, 4, and 5 are respectively elevational and end views of the bypass valve of the invention;

FIG. 13 is a sectional view of the valve poppet taken along the lines 11—11 of FIG. 6.

DETAILED DESCRIPTION OF THE INVENTION

Figure 1:
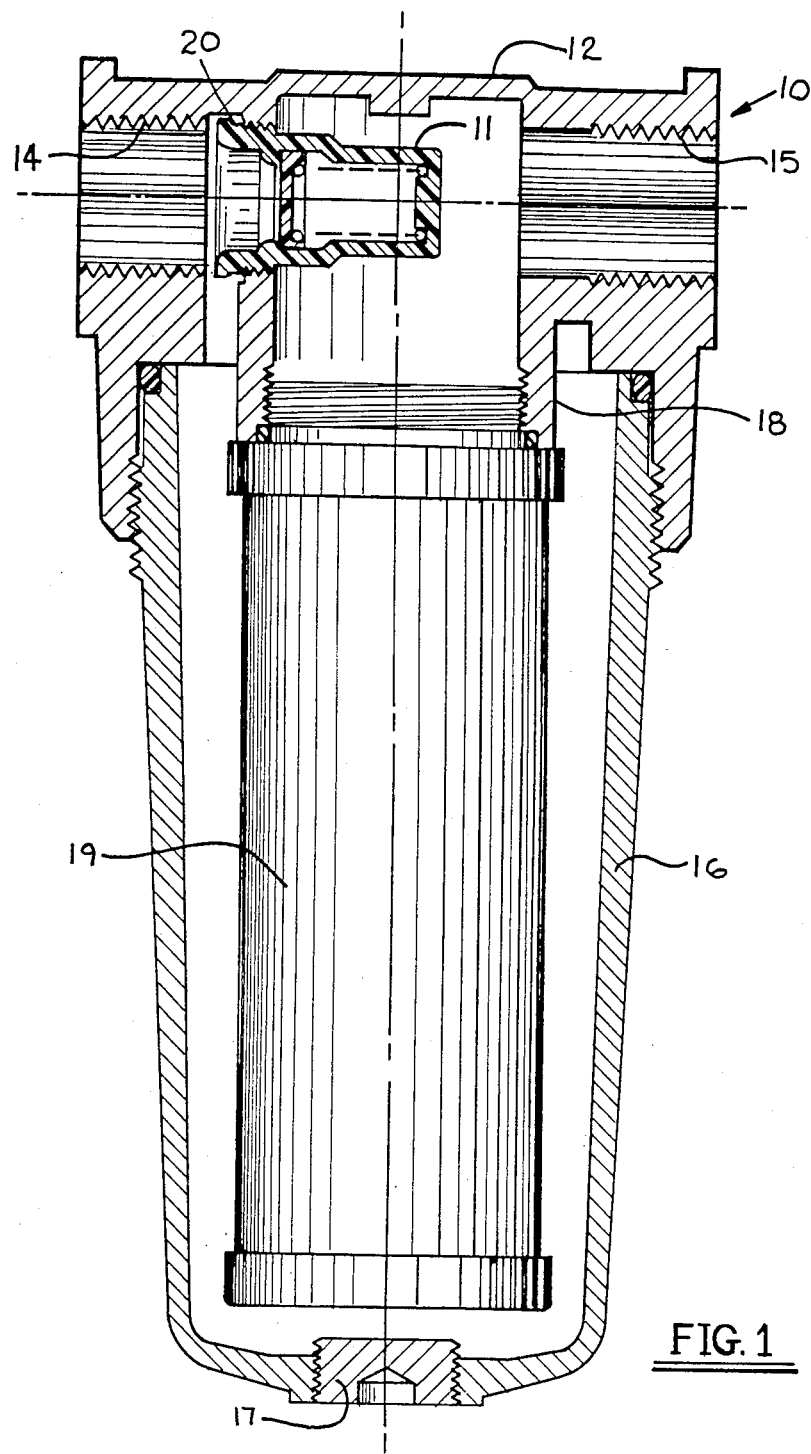
FIG. 1 is a sectional view of a typical valve housing including the cartridge valve of the instant invention threaded in place in an internal bore of the housing.

Referring now to the drawings there is shown in FIG. 1 a cross-section of a typical filter housing 10 including the bypass valve 11 of the invention contained therein. Filter housing 10 may be typically an aluminum die casting comprising filter head 12 having inlet port 14 and outlet port 15 and threadedly receiving at the lower portion thereof element bowl 16 having drain plug 17 at the lowermost portion thereof. Filter head 12 includes cylindrical element support structure 18 in the form of an internally threaded boss adapted to receive filter element 19. Element support 18 includes transverse threaded bore 20 in which is received bypass valve 11 to place bypass valve 11 in the fluid flow path between inlet and outlet ports 14, 15. Typically, fluid is routed from inlet port 14 about the periphery of filter element 19 to the interior thereof and through the center of element support 18 to outlet port 15. In the event of contamination of filter element 19 and a higher differential pressure between inlet and outlet ports 14, 15, bypass valve 11 will be opened to route fluid flow directly to outlet port 15. It will be noted in this example of the invention that threaded bore 20 of element support 18 is aligned with inlet port 14 and is of a slightly smaller diameter so that bypass valve 11 may be inserted through or removed from inlet port 14 as will be more clearly described hereafter.

Referring to the remaining views, bypass valve 11 is shown in more detail as an integrally formed injection molded plastic body member consisting generally of annular valve head 21 and spring housing 24. Valve head 21 is generally cylindrical in configuration having bore 26 therein with valve seat 28 formed within bore 26 at the rearward end of valve head 22. Valve seat 28 is an integral annular shoulder having a flat seating surface at the rearward side thereof and may be smoothly contoured at the forward portion thereof to facilitate fluid flow therethrough. As best seen in FIG. 4, the entry part of bore 26 of valve head 22 is hexagonal in configuration and is adapted for receipt of the end of an allen wrench or the like for assembly of bypass valve 11 in the bore 20 of a filter housing such as shown in FIG. 1. Valve seat 28 thus forms a central circular opening 29 for flow of fluid through the center of valve head 22 in a relatively unrestricted manner.

Figure 10:
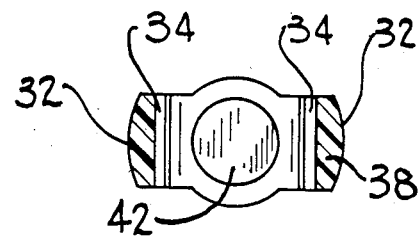
FIG. 10 is a sectional view of the valve body taken along the lines 10—10 of FIG. 6.
Figure 9:
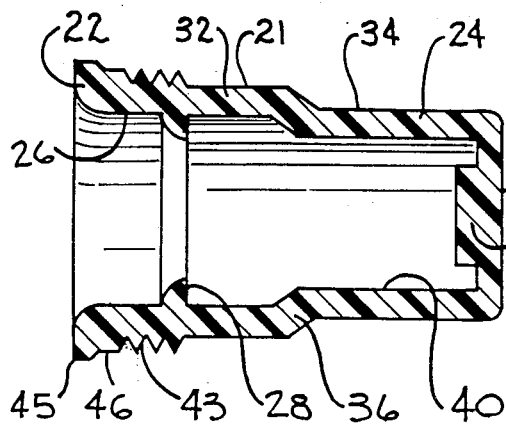
FIG. 9 is a sectional view of the valve body taken along the lines 9—9 of FIG. 6.

As best seen in FIG. 9, spring housing 24 comprises a first pair of diametrically opposed substantially parallel tracks 32 extending rearwardly from valve head 22, and a second pair of diametrically opposed substantially parallel tracks 34, coextensive with and extending rearwardly of the first pair of tracks 32 and terminating in end wall 35. A short angled section of tracks 36 interconnects the first and second pairs of tracks 32, 34. As best seen in the sectional view of FIG. 10, each of the tracks 32, 34 is substantially rectangular in cross-section, having a slightly curved outer peripheral surface 38 to facilitate placement of bypass valve assembly 11 in a threaded opening or the like. Together with annular valve head 22, spring housing 24 forms a generally rectangular opening 40 which serves as a window for placement of internal components of bypass valve 11 as will be described in greater detail hereafter. End wall 35 includes a raised boss 42 thereon, which serves as a seat and spring retainer.

Annular valve head 22 further includes threads 43 at its external periphery at an axial location adjacent valve seat 28 which serve for threaded engagement of bypass valve 11 in a threaded opening such as bore 20 of filter housing 10. Still further, annular head 22 includes lip 45 at its forward end which can serve as a seal and as a stop for placement of bypass valve 11 in a threaded bore. But preferably cylindrical land 46 is included between lip 45 and threads 43 to serve as a means for sealing engagement with a threaded bore. Since valve body 21 is formed entirely of plastic material the threads of the bore 20 can be made penetrate land 46 to effect the seal. It will be noted that the window opening 40 in body member 21 is greater in rearward dimension, that is between annular head 22 and end wall 35, than it is in transverse dimension, which is that distance between opposed pairs of legs 32, 34.

Figure 6:
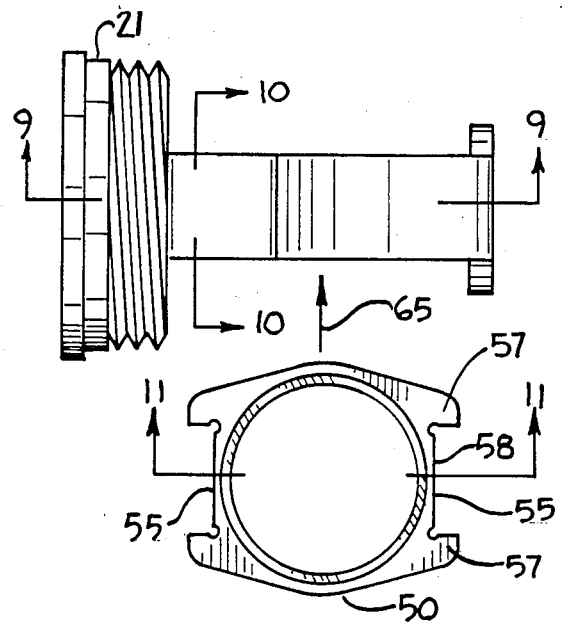
FIGS. 6, 7, and 8 are respectively plan and elevational views of the valve body and valve poppet shown in various stages of assembly with respect to one another.
Figure 11:
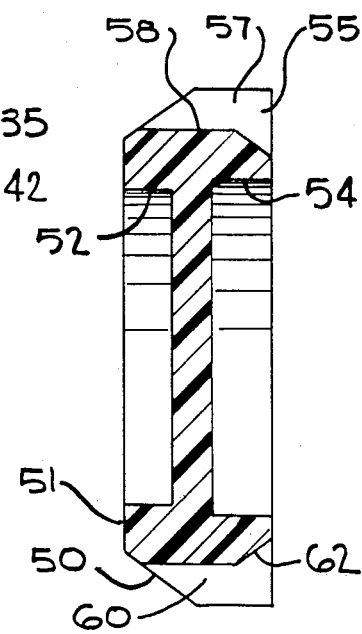

Referring more particularly to the plan and sectional views of FIG. 6 and FIG. 11 respectively, valve poppet 50 is a generally rectangular body member having a transverse, circular, slightly beveled valve surface 51 thereon, sized to mate with and seal against valve seat 28, when positioned adjacent thereto. Valve poppet 50 includes stop bore 52 at one face thereof within poppet valve surface 51 which serves merely for clearance purposes and to reduce the overall cross-section of the body of poppet 50 so that it is sufficiently resilient to assure conformity and proper seating with the valve seat 28. The rearward surface of poppet 50 also includes stop bore 54 which serves a spring retainer function.

At its narrow ends, valve poppet 50 includes a pair of diametrically opposite notches 55 which are generally of rectangular configuration opening outwardly of poppet body member 50 in opposite directions. Each of the notches 55 is formed by a pair of parallel linearly extending arms 57 and an intermediate transverse wall 58 thereby forming a groove extending substantially the thickness of poppet body member 50. As best seen in FIG. 11, arms 57 include bevel 60 at their forward ends, while body member 50 is inwardly beveled as at 62 at the rearward end of each of transverse end walls 58 for clearance purposes, as will be described in greater detail hereafter.

Figure 7:
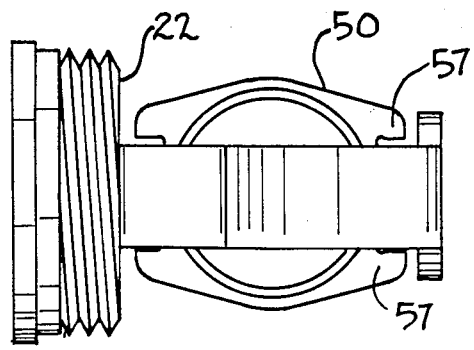
Figure 8:
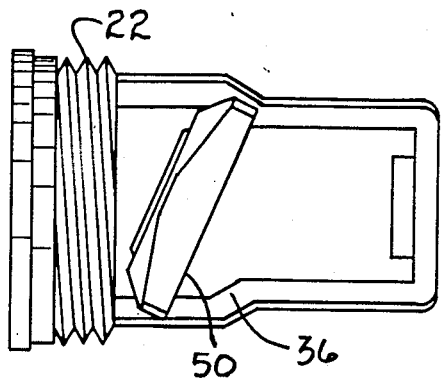

With reference to FIGS. 6, 7 and 8 it will be seen how poppet 50 is dimensioned and assembled relative to valve body member 21. As mentioned, opening 40 in body member 21 is sized so as to freely receive valve poppet 50, which is insertable therein transversely in the direction indicated by arrow 65 in FIG. 6. That is, the overall linear dimension of valve poppet 50 between the ends of diametrically opposite arms 57, which form notch 55, is slightly less than the dimension between valve head 22 and boss 42 on end wall 35 so that poppet 50 may be placed within opening 40 in the position depicted in FIG. 7. Also as seen in FIG. 7, the distance between transversely spaced arms 57, forming the width of notch 55, is slightly larger than the width of tracks 32 so as to provide a guided but relatively free slip-fit therein. Tracks 32, 34 and stop members 36 have a transverse dimension slightly greater than one-half the diameter of poppet valve surface 51 while the overall length of body member 21 may be on the order of 1.0 inch in a preferred embodiment of the invention. In such embodiment the diameter of valve surface 51 is on the order of 0.45 inch.

As seen in FIG. 8, the poppet 50 may then be pivoted upwardly about a transverse axis to a position where eventually poppet valve surface 51 will be in engagement with valve seat 28. However, in the intermediate position depicted in FIG. 8, it will be seen that the bevels 60, 62 are provided to allow sufficient clearance between the tracks, particularly at stop surfaces 36 so that poppet 50 can be moved to a vertical position. In such position, it will be apparent that transverse walls 58 forming notches 55 will be spaced to a dimension slightly less than the spacing between first tracks 32 so that poppet 50 will be guided by and relatively freely slidable on tracks 32 toward and away from valve seat 28. It will be apparent with this dimensioning that as poppet 50 is moved rearwardly from valve seat 28 in a guided nonpivotal movement, that eventually angled tracks 36 will be engaged to prevent further rearward movement of poppet 50. Thus, it will be apparent that first tracks 32 form poppet guide surfaces for poppet 50 and guide its movement toward and away from valve seat 28.

With reference to FIGS. 2 and 3 it will be apparent then that compression spring 70 may be initially compressed and placed in position between poppet 50 and end wall 35 with one end of spring 70 received in stop bore 54 in poppet 50, and the other end disposed about boss 42 on end wall 35. It will be clear then that second tracks 34 together with end wall 35 form a spring retainer for compression spring 70 and serve to retain same within valve body member 21. Further, it will be clear that poppet 50 may be readily removed from body member 21 simply by compression of spring 70 and removal of same through opening 40 of body member 21, whereupon poppet 50 may be pivoted to a horizontal dispostion as shown in FIG. 7 and removed as well. Further, it will be clear that merely by substituting different forms of springs 70, varying degrees of spring rates and closure forces for poppet 50 can be achieved in a relatively easy manner. While it is preferable that body member 21 and valve poppet 50 be formed of plastic and preferably of glass-filled nylon material, it is apparent that different materials may be utilized in this regard and obtain similar results. The advantages of glass-filled nylon include the fact that relatively smooth sealing surface can be achieved at valve seat 28 and poppet valve surface 51, requiring no additional machining as well as a great degree of compatibility with the many different types of fluids which might be encountered with valves of this type.

We claim:

1. A bypass valve for fluid filters and the like, comprising
    a one-piece valve body having an integral annular valve head and spring retainer adapted for mounting in a fluid conduit for controlling fluid flow through said valve head,
    an annular valve seat in said valve head,
    an integral poppet guide disposed between said valve head and said spring retainer said poppet guide comprising a first pair of opposed, spaced tracks extending rearwardly of said valve head,
    a valve poppet slidably supported in said poppet guide for movement into and out of engagement with said valve seat,
    said spring retainer comprising a second pair of opposed, spaced tracks coextensive with said first pair of tracks, said second pair of tracks spaced closer than said first pair of tracks, said second pair of tracks terminating rearwardly of said valve head in closure means for closing said second pair of tracks, and
    a spring disposed between said valve poppet and said closure means for urging said poppet into engagement with said valve seat.

2. The bypass valve set forth in claim 1 wherein said valve poppet includes means for supporting said poppet on said tracks.

3. The bypass valve set forth in claim 2 wherein said supporting means comprises notches on said valve poppet for receiving said tracks.

4. The bypass valve set forth in claim 3 wherein said closure means comprises an end wall closing said second pair of tracks, said end wall engageable by one end of said spring.

5. The bypass valve set forth in claim 4 and further comprising a poppet stop between said pairs of tracks.

6. The bypass valve set forth in claim 5 wherein said poppet stop is an angled track surface interconnecting said first and second pairs of tracks.

7. The bypass valve set forth in claim 6 wherein said valve body and said valve poppet are molded plastic components.

8. The bypass valve set forth in claim 7 wherein said valve body and said valve poppet are formed of glass-filled nylon.

9. A poppet valve assembly, comprising
    a molded plastic body having an annular valve head and valve seat and an integral spring housing extending rearwardly of said valve head, said spring housing terminating in an end wall at the rearward end and forming an opening with said valve head,
    a valve poppet insertable in said housing opening and tiltable to a position in engagement with said valve seat and said spring housing,
    means on said valve poppet for slidably supporting said valve poppet for restricted movement toward and away from said valve seat, and
    a spring disposed between said valve poppet and said spring housing end wall for biasing said valve poppet toward said valve seat.

10. The valve assembly set forth in claim 9 wherein said spring housing comprises first and second opposed, spaced parallel tracks terminating ins aid end wall.

11. The valve assembly set forth in claim 10 wherein said poppet includes first and second opposed, spaced notches thereon engageable with said tracks for slidably guiding said poppet.

12. The valve assembly set forth in claim 11 wherein said notches are generally rectangular in shape and said tracks are generally rectangular in cross-section and closely received in said notches.

13. The valve assembly set forth in claim 11 wherein said spring housing comprises a poppet guide portion adjacent said valve head and a spring retainer portion adjacent said end wall and further comprising a poppet stop member between said guide and retainer portions.

14. The valve assembly set forth in claim 13 wherein said tracks are more closely spaced in said spring retainer portion than in said poppet guide portion.

15. The valve assembly set forth in claim 14 wherein said molded plastic body and said valve poppet are formed of glass filed nylon.

16. A poppet valve assembly, comprising
    a valve body having a central bore therein,
    a valve seat disposed in said bore,
    a pair of diametrically opposed, spaced substantially parallel tracks integral with said valve body extending rearwardly of said valve seat and interconnected at the rearward end wall forming a generally rectangular opening in said body having a larger rearward than transverse dimension,
    a valve poppet disposed in said opening, said valve poppet having a pair of diametrically opposed notches therein engageable with said tracks for slidably supporting said poppet for movement toward and away from said valve seat, said poppet having a linear dimension smaller than the rearward dimension of said rectangular opening so as to be removable from said opening, said poppet being pivotable to a position intermediate said tracks for removal from said valve body, and
    a spring disposed between said end wall and said poppet for urging said poppet into engagement with said valve seat.

17. The assembly set forth in claim 16 further comprising a poppet stop disposed on said tracks for limiting sliding movement of said poppet.

18. The assembly set forth in claim 17 wherein said tracks are closer spaced at said rearward end and said poppet stop comprises nonparallel angled track sections between said end wall and said valve seat.

19. The assembly set forth in claim 18 wherein said valve body includes external threads thereon for engagement in a threaded bore and the like.

20. The assembly set forth in claim 18 wherein said valve body is a unitary molded plastic part.

21. The assembly set forth in claim 20 wherein said valve body is formed of glass-filled nylon.

* * * * *